(12) United States Patent
Asghari et al.

(10) Patent No.: US 7,917,035 B2
(45) Date of Patent: Mar. 29, 2011

(54) END-USER OPTICAL TRANSCEIVER UNIT WITH TRANSMIT SIGNAL ATTENUATION

(75) Inventors: Mehdi Asghari, San Marino, CA (US); Bradley Jonathan Luff, San Marino, CA (US)

(73) Assignee: Kotura, Inc., Monterey Park, CA (US)

( * ) Notice: Subject to any disclaimer, the term of this patent is extended or adjusted under 35 U.S.C. 154(b) by 703 days.

(21) Appl. No.: 11/985,062

(22) Filed: Nov. 13, 2007

(65) Prior Publication Data

US 2009/0123149 A1 May 14, 2009

(51) Int. Cl.
*H04B 10/00* (2006.01)
(52) U.S. Cl. .................. 398/136; 398/137; 398/197
(58) Field of Classification Search .............. 398/136, 398/137, 197
See application file for complete search history.

(56) References Cited

U.S. PATENT DOCUMENTS

| | | | |
|---|---|---|---|
| 2003/0011855 A1* | 1/2003 | Fujiwara | 359/177 |
| 2004/0253003 A1 | 12/2004 | Farmer et al. | |
| 2007/0065089 A1* | 3/2007 | Matsuoka et al. | 385/140 |
| 2007/0076505 A1 | 4/2007 | Radtke et al. | |
| 2007/0154213 A1* | 7/2007 | Hinderthur | 398/25 |
| 2007/0172239 A1* | 7/2007 | Yamazaki et al. | 398/68 |
| 2008/0292312 A1* | 11/2008 | Oron et al. | 398/33 |

* cited by examiner

*Primary Examiner* — Nathan M Curs
(74) *Attorney, Agent, or Firm* — Gavrilovich, Dodd & Lindsey, LLP

(57) ABSTRACT

A transceiver unit for use at an end-location in a communications network includes a downstream monitor configured to monitor downstream optical signals that travel from a service provider to the end-location. The downstream optical signals carry downstream data for use by a device in communication with the transceiver unit. At least a portion of the optical path traveled by the downstream optical signals is on a common optical fiber that carries downstream optical signals for other end locations. The transceiver unit also includes an upstream attenuator configured to attenuate upstream optical signals traveling from the end-location to the service provider. At least a portion of the optical path traveled by the upstream optical signals is on the common optical fiber. The transceiver unit also includes electronics configured to operate the upstream optical attenuator in response to output from the downstream monitor.

57 Claims, 2 Drawing Sheets

END-USER OPTICAL TRANSCEIVER UNIT WITH TRANSMIT SIGNAL ATTENUATION

FIELD

The present invention relates to units used by an end-user of an optical network and particularly, a transceiver unit for use with an optical network.

BACKGROUND

A variety of optical networks optically transmit and receive data to multiple end-users. For instance, optical networks can transmit television signals and DSL signals to an end-user and can receive DSL signals or other signals from an end-user. Each end-user has a transceiver unit for receiving and transmitting this data.

It is desirable for the optical network to be able to communicate with the transceiver unit itself. As a result, there is a need for a transceiver unit that can communicate with the optical network.

SUMMARY

A transceiver unit for use at an end-location in a communications network includes a downstream monitor configured to monitor downstream optical signals that travel from a service provider to the end-location. The downstream optical signals carry downstream data for use by a device in communication with the transceiver unit. At least a portion of the optical path traveled by the downstream optical signals is on a common optical fiber that carries downstream optical signals for other end locations. The transceiver unit also includes an upstream attenuator configured to attenuate upstream optical signals traveling from the end-location to the service provider. At least a portion of the optical path traveled by the upstream optical signals is on the common optical fiber. The transceiver unit also includes electronics configured to operate the upstream optical attenuator in response to output from the downstream monitor.

In some instances, the electronics are configured to increase a degree of attenuation provided by the upstream attenuator in response to the output from the downstream monitor indicating an increase in an intensity of the downstream optical signals and/or the electronics are configured to decrease a degree of attenuation provided by the upstream attenuator in response to the output from the downstream monitor indicating a decrease in an intensity of the downstream optical signals.

In one embodiment, the downstream optical signals carry downstream control data and the electronics are configured to operate the upstream optical attenuator in response to the downstream control data. In some instances, the electronics are configured to employ the upstream attenuator as a modulator and to modulate upstream control data onto the upstream optical signals. The electronics can modulate the upstream control data onto the upstream optical signals in response to the downstream control data.

A method of using a transceiver unit for use at an end-location of a communications network includes monitoring downstream optical signals that travel from a service provider to the end-location. The downstream optical signals carry downstream data for use by a device in communication with to the transceiver unit. At least a portion of an optical path traveled by the downstream optical signals is on a common optical fiber along with downstream optical signals for other end locations. The method also includes attenuating upstream optical signals in response to results of monitoring the downstream optical signals. The upstream optical signals travel to the common waveguide from a transmitter included in the transceiver unit. The upstream optical signals carry upstream data for use by the communications network or the provider.

DESCRIPTION

The transceiver unit includes a receiver that receives downstream optical signals from a communications network or from a service provider. The downstream optical signals include downstream data to be processed by a device in communication with the transceiver unit. The transceiver unit includes a downstream monitor that is optically between the communications network and the receiver. The transceiver unit also includes a transmitter configured to generate upstream optical signals that are transmitted to the communications network or to the service provider. The upstream optical signals include upstream data to be processed by the communications network or by the service provider. The transceiver unit also includes an upstream attenuator that is optically between the transmitter and the communications network. The transceiver unit also includes electronics that operate the upstream attenuator in response to output from the downstream monitor.

In some instances, the downstream optical signals include downstream control data in addition to the downstream data. The electronics can receive the downstream control data from the output of the downstream monitor and operate the upstream attenuator in response to the downstream control data. For instance, the downstream control data can include a request that the transceiver unit reduce the intensity of the upstream optical signals. In response, the electronics can operate the attenuator so as to reduce the intensity of the upstream optical signals. Additionally or alternately, the downstream control data can include a request that the transceiver unit increase the intensity of the upstream optical signals. In response, the electronics can reduce the amount of attenuation provided by the upstream attenuator and can accordingly increase the intensity of the upstream optical signals.

In some instances, the electronics are configured to operate the upstream attenuator as a modulator and can accordingly modulate upstream control data onto the upstream optical signals. As a result, the transceiver unit can communicate with the service provider and/or with the communications network. For instance, the communications network and/or the provider can send the transceiver unit downstream control data that includes an inquiry for the transceiver unit. In response to the inquiry, the electronics can encode upstream control data onto the upstream optical signals such that the upstream control data answers the inquiry. In another example, the electronics can modulate upstream control data onto the upstream optical signals such that the upstream control data includes an inquiry to be answered by the communications network and/or the provider. In response, the communications network and/or the provider can send the transceiver unit downstream control data that responds to the inquiry.

Figure 1:
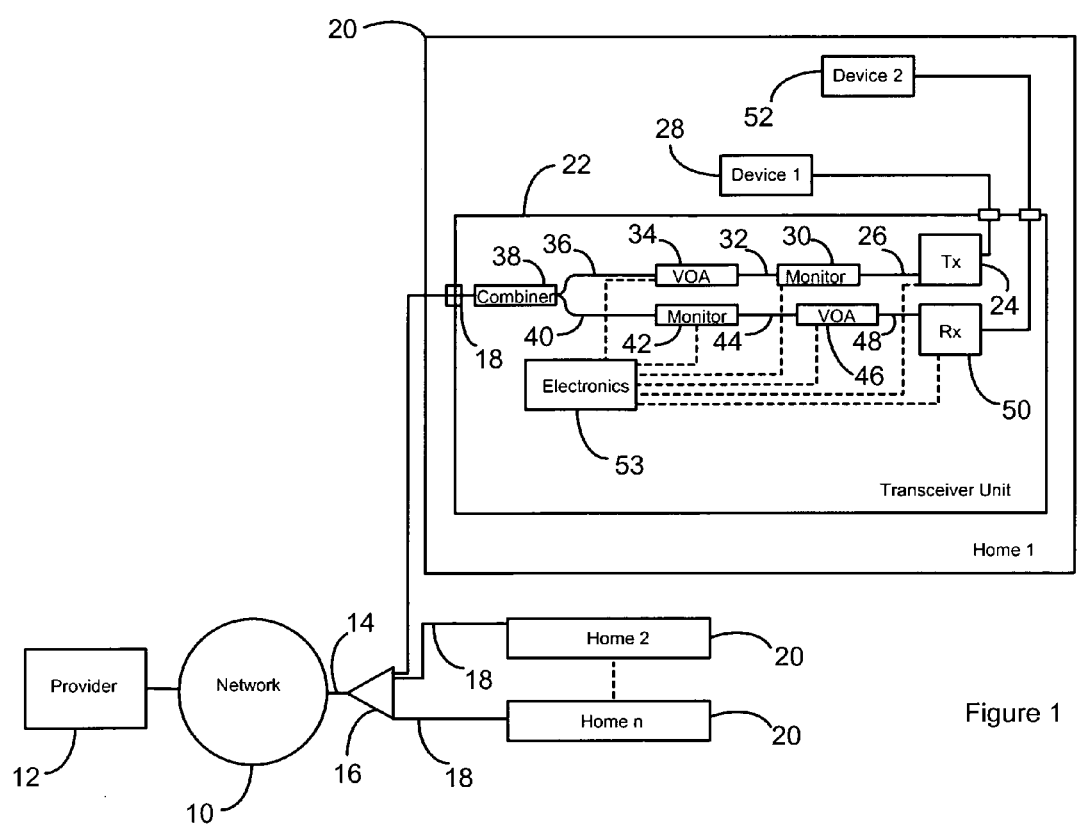
FIG. 1 illustrates a transceiver unit included in an optical system. The transceiver unit is configured as a diplexer.

FIG. 1 is a schematic of an optical system. The optical system is configured to transport optical signals to multiple end-locations 20. For instance, a communications network 10 can receive downstream signals from a provider 12. The downstream signals can be optical signals but need not be optical signals and can be electrical signals. The downstream signals can carry downstream data. Examples of downstream data include analog signals such as television signals and/or digital signals such as high bandwidth data signals like xDSL signals. The communications network 10 uses the downstream signals to generate downstream optical signals on a common waveguide 14 such as a common optical fiber. Generating downstream optical signals can include or consist of processing the downstream signals and/or routing the downstream signals to the common waveguide 14. Information carried by the downstream optical signals can include or consist of a portion of the downstream data or all of the downstream data.

The common waveguide 14 carries the downstream optical signals to a signal divider 16. The signal divider 16 can divide the downstream optical signals onto location waveguides 18 that each carries a portion of the downstream optical signals to each of the different end-locations 20. The signal divider can have demuxing/multiplexing functionality but need not. As a result, the signal divider can serve as a signal splitter. Accordingly, the location waveguides 18 can carry analog or digital signals to each of the end locations.

The provider 12 can also receive upstream optical signals from the different end-locations 20. For instance, each end-location 20 can transmit upstream optical signals that are carried to the signal divider 16 by a location waveguide 18. The signal divider 16 combines the upstream optical signals from different end-locations onto the common waveguide 14. The common waveguide 14 carries the upstream optical signals to the communications network 10. The upstream optical signals can carry upstream data. Examples of upstream data include digital signals such as high bandwidth data signals like xDSL signals. The communications network 10 uses the upstream optical signals to generate upstream signals that are received by the provider 12. The upstream signals can be optical signals or other signals such as electrical signals. Generating the upstream signals can include or consist of processing the upstream optical signals so as to generate the upstream signals and/or routing the upstream optical signals to the provider. Information carried by the upstream signals can include or consist of a portion of the upstream data or all of the upstream data.

In FIG. 1, the different end-locations 20 to which the optical signals are transmitted and/or received are labeled home 1 through home n. Accordingly, the optical network can provide optical signals to a plurality of homes. Although FIG. 1 shows the end-locations 20 as homes, the end-locations 20 can be other buildings such as businesses, schools, etc. Alternately, the end-location 20 can be a case located outdoors.

Each end-location 20 includes a transceiver unit 22. In some instances, these transceiver units 22 are called multiplexers such as diplexers or triplexers depending on the number of different signals handled by the transceiver unit 22.

The transceiver unit 22 includes a transmitter 24 configured to transmit the upstream optical signals on a first upstream waveguide 26. The transmitter 24 is in communication with a first device 28 through a port in the transceiver unit 22. Examples of the first device 28 include computers and computer modems. The signals from the first device 28 are received by the transmitter 24 which uses the received signals to generate the upstream optical signals. The first upstream waveguide 26 carries the upstream optical signals from the transmitter 24 to an upstream monitor 30. A second upstream waveguide 32 transports the upstream optical signals from the upstream monitor 30 to an upstream attenuator 34 which can be a tunable optical attenuator. A third upstream waveguide 36 transports the upstream optical signals from the upstream attenuator 34 to a combiner 38. The combiner can have multiplexer/demultiplexer functionality or can be a splitter/combiner that splits the signals as they travel in one direction and combines the signals as they travel in the opposite direction. Accordingly, the combiner 38 transports the upstream optical signals from the third upstream waveguide 36 to the location waveguide 18 which carries the upstream optical signals through a port to the signal divider 16.

The combiner 38 also transports the downstream optical signals from the location waveguide 18 to a first downstream waveguide 40. The first downstream waveguide 40 transports the downstream optical signals to a downstream monitor 42. A second downstream waveguide 44 transports the downstream optical signals from the downstream monitor 42 to a downstream attenuator 46 which can be a tunable optical attenuator. A third downstream waveguide 48 transports the downstream optical signals from the downstream attenuator 46 to a receiver 50 that is in communication with a second device 52 through a port in the transceiver unit 22. Examples of the second device 52 include computers, computer modems, television sets, and set-top boxes. The downstream optical signals are received by the receiver 50 which uses the received signals to generate device signals that are processed by the second device 52. The device signals can be optical signals or other signals such as electrical signals. In some instances, the receiver 50 converts the downstream optical signals to electrical signals that are processed by the second device 52.

The upstream optical signals and the downstream optical signals are generally at different wavelengths. For instance, the upstream optical signals can be at a wavelength of 1550 nm while the downstream optical signals are at a wavelength of 1310 nm.

The downstream monitor 42 and the upstream attenuator 34 are each in electrical communication with electronics 53. The electronics 53 are configured to operate the upstream attenuator 34 in response to output from the downstream monitor 42. Suitable downstream monitors 42 sample a portion of the downstream optical signal and covert the sampled portion of the optical signal to an electrical signal that is received by the electronics 53. In response to the electrical signal that the electronics 53 receive from the downstream monitor 42, the electronics 53 can generate an electrical signal that is received by the upstream attenuator 34. The upstream attenuator 34 is configured such that the electrical signal that the upstream attenuator 34 receives from the electronics 53 can cause attenuation of the upstream optical signal. As a result, the electronics 53 can attenuate the upstream optical signal in response to output from the downstream monitor 42. In one example, the electronics 53 use the electrical signal received from the downstream monitor 42 to determine the intensity and/or power of the downstream optical signals. The electronics 53 attenuate the upstream optical signals in response to the determined intensity and/or power. For instance, the electronics 53 can be configured to decrease the amount of upstream optical signal attenuation in response to decreases in the determined power or intensity and to increase the amount of upstream optical signal attenuation in response to increases in the determined power or intensity. As a result, the electronics 53 can be configured to adjust the intensity of the upstream optical signals to a level where the intensities of the upstream and downstream optical signals are configured for optimal system performance.

In another example, the communications network 10 and/or the provider 12 are configured to modulate the downstream signals and/or the downstream optical signals such that the downstream optical signal includes downstream control data in addition to the downstream data. The downstream monitor 42 and/or the electronics 53 can be configured to separate the downstream control data from the downstream data. For instance, a variety of multiplexing techniques can be employed so the electronics 53 and/or the downstream monitor 42 can separate the downstream control data from the downstream data. In one example, the downstream control data is amplitude modulated at a lower frequency than the downstream data. For instance, the downstream control data can be amplitude modulated at kHz to MHz while the downstream data is modulated at >10 MHz. When the downstream control data is amplitude modulated at a lower frequency than the downstream data, the downstream monitor 42 can be a low speed monitor with a response time that effectively filters out the downstream data so the electrical signal generated by the downstream monitor 42 reflects primarily the downstream control data. Alternately, the downstream monitor 42 can be a high-speed monitor and the electronics 53 can include filters configured to filter the higher frequency components from the electrical signal that the electronics 53 receive from the downstream monitor 42.

When the downstream optical signals include downstream control data, the communications network and/or the provider can communicate data to the electronics. For instance, the communications network and/or the provider can intermittently or periodically send to the transceiver unit downstream control data that indicates the status of the communications network and/or the provider to the electronics. Additionally or alternately, when the downstream optical signals include downstream control data, the electronics 53 can be configured to control the degree of upstream optical signal attenuation in response to the downstream control data. For instance, the downstream control data can include a request that the intensity or power of the upstream optical signals be increased. In response, the electronics 53 can reduce the level of upstream optical signal attenuation. Alternately, the downstream control data can include a request that the intensity or power of the upstream optical signals be decreased. In response, the electronics 53 can increase the level of upstream optical signal attenuation.

In some instances, the upstream attenuator 34 is operated as a modulator and the electronics can modulate the upstream optical data such that the upstream optical signals include upstream control data in addition to the upstream data. A variety of multiplexing techniques can be employed so the communications network 10 and/or the provider 12 can separate the upstream control data from the upstream data. In one example, the upstream control data is modulated at a lower frequency than the upstream data. For instance, the upstream control data can be amplitude modulated at a lower frequency than the upstream data. For instance, the upstream control data can be amplitude modulated at <1 MHz while the upstream data is modulated at >10 MHz.

When the upstream attenuator 34 is operated a modulator, the electronics 53 can employ the upstream control data to communicate information to the communications network 10 and/or to the provider 12. For instance, the electronics 53 can cause the upstream optical signals to include upstream control data that includes requests or inquiries. An example inquiry requests that the provider 12 and/or the communications network 10 increases the intensity and/or power of the downstream optical signals. The upstream control data need not include inquiries and can communicate unprompted information to the communications network or the provider. For instance, the electronics can periodically and/or intermittently send upstream control data that indicates information such as user status and system health.

When the upstream attenuator 34 is operated as a modulator and the downstream optical signals include downstream control data, the electronics 53 can employ the upstream attenuator 34 to respond to the downstream control data. For instance, the communications network 10 and/or the provider 12 can provide downstream control data that includes inquiries or requests. In response, the electronic can employ the upstream attenuator 34 to provide the communications network 10 and/or the provider 12 upstream control data that responds to the inquiry. For instance, the communications network 10 and/or the provider 12 can send to the transceiver unit downstream control data that inquires about the status of the transceiver unit. In response, the electronics can employ the upstream attenuator 34 to provide the communications network 10 and/or the provider 12 upstream control data that indicates the status of the transceiver unit. Additionally, the electronics can employ the upstream attenuator 34 to provide the communications network 10 information that can be used to pinpoint the location of system-level faults such as fiber line faults. An example of a fiber line fault is a break in an optical fiber. The electronics can provide this type of information in response to an inquiry or without receiving an inquiry.

The downstream attenuator 46 and the receiver 50 are in electrical communication with the electronics 53. The electronics 53 can monitor the output of the receiver 50 to determine the intensity and/or power of the downstream optical signals. The electronics 53 can adjust the degree of attenuation provided by the downstream attenuator 46 in response to the determined intensity or power. As a result, the electronics 53 can operate a feedback loop that employs the intensity of the downstream optical signals received by the receiver 50 to tune the intensity of the downstream optical signals received by the receiver 50. For instance, the electronics 53 can be configured to increase the degree of attenuation in response to increases in the intensity of the downstream optical signals received by the receiver 50. Increasing the degree of attenuation decreases the intensity of the downstream optical signals received by the receiver 50. As a result, the electronics 53 can prevent the intensity of the optical signals received by the receiver 50 from exceeding a threshold where damage to the receiver 50 can occur or where the receiver 50 becomes saturated. In some instances, the electronics 53 are configured to tune the degree of attenuation in such that the intensity of the downstream optical signals received by the receiver 50 does not exceed an upper threshold. Additionally or alternately, the electronics 53 can be configured to decrease the degree of attenuation in response to decreases in the intensity of the downstream optical signals. Decreasing the degree of attenuation increases the intensity of the downstream optical signals received by the receiver 50. As a result, the electronics 53 can prevent the intensity of the optical signals received by the receiver 50 from falling below a threshold where the receiver 50 is able to detect the downstream optical signals. In some instances, the electronics 53 are configured to tune the degree of attenuation such that the intensity of the downstream optical signals received by the receiver 50 does not fall below a lower threshold.

The downstream attenuator 46 is optional and need not be included in the transceiver unit 22.

The upstream monitor 30 and the transmitter 24 are in electrical communication with the electronics 53. The electronics 53 can monitor the output of the upstream monitor 30 to determine the intensity and/or power of the upstream optical signals. The electronics 53 can adjust the power of the upstream optical signals generated by the transmitter 24 in response to the determined intensity or power. As a result, the electronics 53 can operate a feedback loop that employs the intensity of the upstream optical signals received by the upstream monitor 30 to tune the power of the upstream optical signals generated by the transmitter 24. For instance, the electronics 53 can be configured to decrease the power of the upstream optical signals generated by the transmitter 24 as the intensity of the upstream optical signals received by the upstream monitor 30 increases. Decreasing the power decreases the intensity of the upstream optical signals received by the communications network 10 and/or the provider 12. In some instances, the electronics 53 are configured to tune the power of the upstream optical signals generated by the transmitter 24 such that the intensity of the upstream optical signals received by the upstream monitor 30 does not exceed an upper threshold. Additionally or alternately, the electronics 53 can be configured to increase the power of the upstream optical signals generated by the transmitter 24 in response to decreases in the intensity of the upstream optical signals received by the upstream monitor 30. Increasing the power of the upstream optical signals generated by the transmitter 24 increases the intensity of the upstream optical signals received by the communications network 10 and/or the provider 12. In some instances, the electronics 53 are configured to tune the power of the upstream optical signals generated by the transmitter 24 such that the intensity of the upstream optical signals received by the upstream monitor 30 does not fall below a lower threshold.

The upstream monitor 30 is optional and need not be included in the transceiver unit 22.

The first upstream waveguide 26, the second upstream waveguide 32, and the third upstream waveguide 36 can be optical fibers and the transmitter 24, the upstream attenuator 34 and the upstream monitor 30 can be included on discrete components. Alternately, two or more devices selected from a group consisting of the transmitter 24, the upstream attenuator 34 and the upstream monitor 30 can be included on the same component. For instance, the transmitter 24 and the upstream attenuator 34 can be included on the same component, or the upstream attenuator 34 and the upstream monitor 30 can be included on the same component, or the transmitter 24, the upstream attenuator 34 and the upstream monitor 30 can be included on the same component. When two or more of the devices are included on the same component, one or more waveguides on the component can serve as the first upstream waveguide 26 or the second upstream waveguide 32.

The first downstream waveguide 40, the second downstream waveguide 44, and the third downstream waveguide 48 can be optical fibers and the receiver 50, the downstream attenuator 46 and the downstream monitor 42 can be included on discrete components. Alternately, two or more devices selected from a group consisting of the receiver 50, the downstream attenuator 46 and the downstream monitor 42 can be included on the same component. For instance, the receiver 50 and the downstream attenuator 46 can be included on the same component, or the downstream attenuator 46 and the downstream monitor 42 can be included on the same component, or the receiver 50, the downstream attenuator 46 and the downstream monitor 42 can be included on the same component. When two or more of the devices are included on the same component, one or more waveguides on the component can serve as the first downstream waveguide 40 or the second downstream waveguide 44.

The combiner 38 can be included on a discrete component or can be included on one of the above components. Alternately, the combiner 38 can be a combiner 38 that is typically employed in combination with optical fibers. Examples of suitable components that can include one or more devices selected from a group consisting of the transmitter 24, the upstream attenuator 34, the upstream monitor 30, the receiver 50, the downstream attenuator 46, the downstream monitor 42, and the combiner 38 include the optical components and optical device commonly called planar optical devices.

Suitable upstream attenuators 34 and/or downstream attenuators 46 include a variety of commercially available attenuators and can be variable attenuators. In one example, the upstream attenuator 34 and/or downstream attenuator 46 are built on a silicon-on-insulator platform. As noted above, the upstream attenuator 34 can be used as an optical modulator. Optical modulators can be distinguished from standard optical attenuators in that optical modulators can modulate data at frequencies on the order of 1 GHz while an attenuator can modulate data at frequencies on the order of 1 MHz. As noted above, the upstream control data may be amplitude modulated at a lower frequency than the upstream data. In these instances, a variable optical attenuator may have enough speed to provide the required modulation.

The upstream monitor 30 and/or the downstream monitor 42 can include a primary waveguide that carries the upstream optical signal and a tap waveguide that taps a portion of the upstream optical signal from the primary waveguide. The tap waveguide can carry the tapped portion of the upstream optical signal to a light sensor that converts the tapped portion of the upstream optical signal to an electrical signal that is received by the electronics 53. Examples of light sensors include one or more photodetectors, one or more photodiodes and one or more avalanche photodiodes, charge coupled devices (CCDs), and photomultiplier tubes. A specific example of a light sensor is an InGaAs PIN detector. An example of a suitable upstream monitor 30 is disclosed in U.S. patent application Ser. No. 10/161,208, filed on May 3, 2002, entitled "Waveguide Tap Monitor," issued as U.S. Pat. No. 6,885,795, and incorporated herein in its entirety and also in U.S. patent application Ser. No. 10/161,213, filed on May 3, 2002, entitled "Waveguide Tap Monitor," and incorporated herein in its entirety. An alternative to light sensors that include tap waveguide are in-line light sensors that do not include a tap waveguide and sense the upstream optical signals in the primary waveguide. A suitable in-line sensor is disclosed in U.S. patent application Ser. No. 10/500,318, filed on May 9, 2005, entitled "In-Line Light Sensor," and incorporated herein in its entirety.

A suitable combiner 38 includes, but is not limited to, an optical coupler. A particular example of a suitable optical coupler is a Wavelength-Division Multiplexing (WDM) coupler.

Suitable transmitters 24 include or consist of lasers configured to generate a light signal at the wavelength desired for the upstream optical signals. Examples of suitable lasers include, but are not limited to, a DFB lasers, and FP lasers. In some instances, the laser can be directly modulated or an external modulator can be employed. When an external modulator is employed, a modulator can be positioned between the laser and the upstream monitor 30 to provide the necessary modulation.

Suitable receivers 50 include or consist of one or more light sensors configured to convert the received downstream light signal to an electrical signal. Examples of light sensors include, one or more photodetectors, one or more photodiodes and one or more avalanche photodiodes, charge coupled devices (CCDs), and photomultiplier tubes. Specific examples of suitable light sensors are PIN (P-type Insulator N-type) light detectors such as InGaAs PIN detector. In some instances, the receiver 50 includes one or more electrical filters that receives the electrical signals from the light sensors. The one or more electrical filters can be configured to filter the downstream control data out of the electrical signals. As a result, an output of the one or more filters carries primarily the downstream data.

Suitable electronics 53 include a controller. A suitable controller includes, but is not limited to, a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions attributed to the electronics 53. A general-purpose processor may be a microprocessor, but in the alternative, the controller may include or consist of any conventional processor, microcontroller, or state machine. A controller may also be implemented as a combination of computing devices, e.g., a combination of a DSP and a microprocessor, a plurality of microprocessors, one or more microprocessors in conjunction with a DSP core, or any other such configuration.

The electronics 53 can optionally include a memory in communication with the controller. The electronics 53 can store data for executing the functions of the electronics 53 in the memory. The memory can be any memory device or combination of memory devices suitable for read/write operations.

In some instances, the electronics 53 include a computer-readable medium in communication with the controller. The computer-readable medium can have a set of instructions to be executed by the controller. The controller can read and execute instructions included on the computer-readable medium. The controller executes the instructions such that the electronics 53 perform one or more of the described functions. The computer-readable medium cab be different from the memory or can be the same as the memory. Suitable computer-readable media include, but are not limited to, optical discs such as CDs, magnetic storage diskettes, Zip disks, magnetic tapes, RAMs, and ROMs.

As will be described in more detail below, some functions of the electronics 53 may be executed using hardware as opposed to executing these functions in firmware and/or software. When electronics 53 implement a function using firmware and/or software, the electronics 53 employ a controller to execute instructions on a computer-readable medium. For instance, the electronics 53 can employ a controller reading software written on a RAM implement a function. In contrast, when the electronics 53 implement a function in hardware, the hardware does not execute instructions on a computer-readable medium. In one example, the electronics consist of RC circuits.

Figure 2:
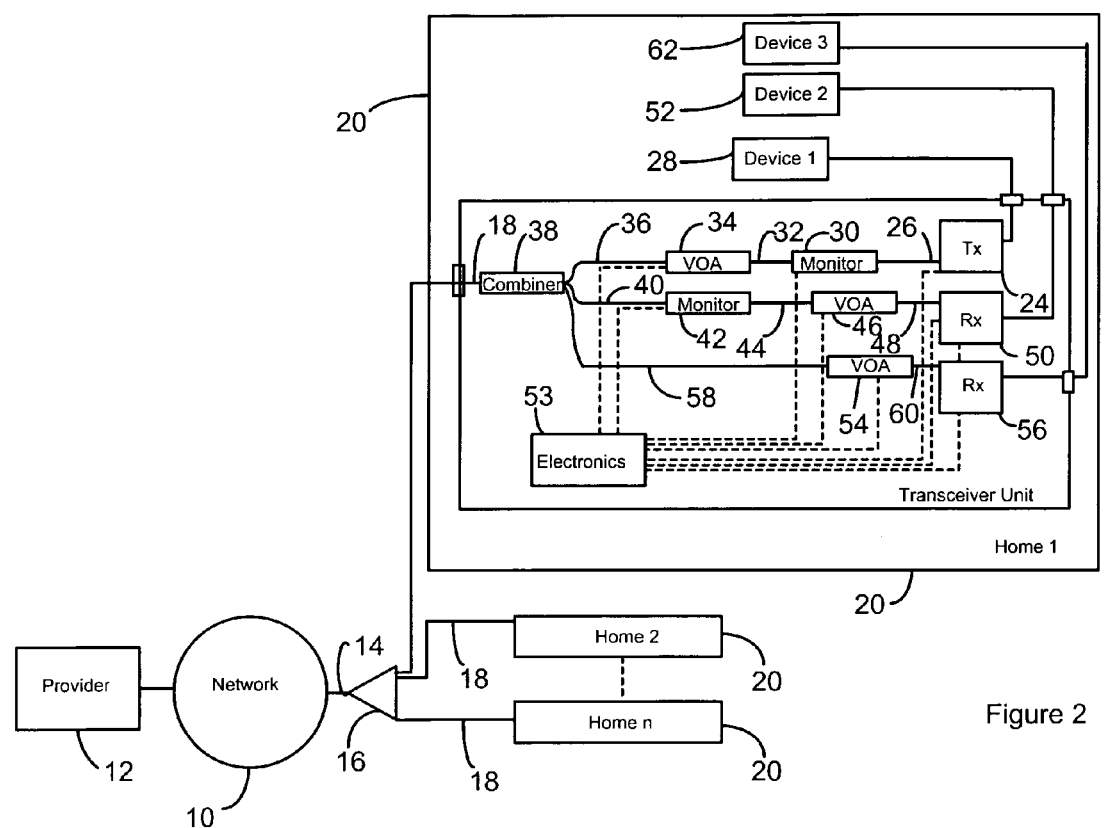
FIG. 2 illustrates a transceiver unit included in an optical system. The transceiver unit is configured as a triplexer.

The transceiver unit 22 illustrate in FIG. 1 operates as a diplexer because it operates on optical signals at two different wavelengths. However, the transceiver unit can be a higher order multiplexer. For instance, FIG. 2 illustrates a transceiver unit that operates as a triplexer. In addition to the components disclosed in FIG. 1, the transceiver unit 22 includes a secondary downstream attenuator 54, and a secondary downstream receiver 56.

When one or more transceiver units 22 in the optical system are configured to operate as a triplexer, the transceiver unit 22 can receive both downstream optical signals and secondary downstream optical signals from the communications network 10. The downstream optical signals and secondary downstream optical signals will generally be on different wavelengths. For instance, the downstream optical signals can be at 1480 nm and the secondary downstream optical signals can be at 1520 nm. The downstream optical signals can carry the downstream data described above while the secondary downstream optical signals carry secondary downstream data. For instance, the downstream optical signals can carry digital signals such as high bandwidth data signals like xDSL signals while the secondary downstream optical signals carries analog signals such as television signals.

The combiner 38 transports the secondary downstream optical signals from the location waveguide 18 to a secondary first downstream waveguide 58. The secondary first downstream waveguide 58 transports the secondary downstream optical signals to the secondary downstream attenuator 54. A secondary second downstream waveguide 60 transports the secondary downstream optical signals from the secondary downstream attenuator 54 to the secondary receiver 56. The secondary receiver 56 is in communication with a third device 62 through a port in the transceiver unit 22. Examples of the third device 62 include computers, computer modems, television sets, and set-top boxes. In one example, the second device 52 is a computers or computer modems and the third device 62 is a television sets, or set-top box. The secondary downstream optical signals are received by the secondary receiver 56 which uses the received signals to generate device signals that are processed by the third device 62. The secondary receiver can employ an optical filter or optical demultiplexer to separate the secondary optical signals from the primary optical signal. Additionally or alternately, the secondary receiver or third device can include an electrical filter or an electrical demultiplexer to separate electrical signals that originate from the secondary optical signals from electrical signals that originate from the primary optical signal signals. The device signals can be optical signals or other signals such as electrical signals. In some instances, the receiver 50 converts the secondary downstream optical signals to electrical signals that are processed by the third device 62.

As noted above, the upstream attenuator 34 can be operated as a modulator, the downstream optical signals can include downstream control data, and the electronics 53 can employ the upstream attenuator 34 to respond to the downstream control data. When the transceiver unit 22 operates as a triplexer, the downstream control data can include queries about the status of the secondary receiver 56 and/or the secondary attenuator. For instance, the communications network 10 and/or the provider 12 can provide downstream control data that requests the intensity of the secondary downstream optical signals being received at the secondary receiver 56. The secondary receiver 56 can be in electrical communication with the electronics 53 and the electronics 53 can be configured to determine the intensity and/or power of the secondary downstream optical signals being received at the secondary receiver 56. As a result, the electronics can employ the upstream attenuator 34 to provide the communications network 10 and/or the provider 12 upstream control data that indicates the intensity of the secondary downstream optical signals being received at the secondary receiver 56.

The secondary downstream attenuator 54 and the secondary receiver 56 are in electrical communication with the electronics 53. The electronics 53 can monitor the output of the secondary receiver 56 to determine the intensity and/or power of the secondary downstream optical signals. The electronics 53 can adjust the degree of attenuation provided by the secondary downstream attenuator 54 in response to the determined intensity or power. As a result, the electronics 53 can operate a feedback loop that employs the intensity of the secondary downstream optical signals received by the secondary receiver 56 to tune the intensity of the secondary downstream optical signals received by the secondary receiver 56. For instance, the electronics 53 can be configured to increase the degree of attenuation in response to increases in the intensity of the secondary downstream optical signals received by the secondary receiver 56. Increasing the degree of attenuation decreases the intensity of the secondary downstream optical signals received by the secondary receiver 56. As a result, the electronics 53 can prevent the intensity of the secondary optical signals received by the secondary receiver 56 from exceeding a threshold where damage to the secondary receiver 56 can occur or where the secondary receiver 56 becomes saturated. In some instances, the electronics 53 are configured to tune the degree of attenuation in such that the intensity of the secondary downstream optical signals received by the secondary receiver 56 does not exceed an upper threshold. Additionally or alternately, the electronics 53 can be configured to decrease the degree of attenuation in response to decreases in the intensity of the secondary downstream optical signals. Decreasing the degree of attenuation increases the intensity of the secondary downstream optical signals received by the receiver 50. As a result, the electronics 53 can prevent the intensity of the secondary optical signals received by the secondary receiver 56 from falling below a threshold where the secondary receiver 56 is able to detect the secondary downstream optical signals. In some instances, the electronics 53 are configured to tune the degree of attenuation such that the intensity of the secondary downstream optical signals received by the secondary receiver 56 does not fall below a lower threshold.

The secondary downstream attenuator 54 is optional and need not be included in a transceiver unit 22 that operates as a triplexer.

The secondary first downstream waveguide 58 and the secondary second downstream waveguide 60 can be optical fibers and the secondary receiver 56 and the secondary downstream attenuator 54 can be included on discrete components. Alternately, the secondary receiver 56 and the secondary downstream attenuator 54 can be included on the same component. When the secondary receiver 56 and the secondary downstream attenuator 54 are included on the same component, one or more waveguides on the component can serve as the secondary second downstream waveguide 60.

Examples of suitable components that can include one or more devices selected from a group consisting of the secondary downstream attenuator 54 and the secondary downstream receiver 56 include the optical components and optical device commonly called planar optical devices.

Suitable secondary downstream attenuators 54 include a variety of commercially available optical attenuators. In one example, the secondary downstream attenuator 54 is built on a silicon-on-insulator platform.

A suitable combiner 38 for use with a triplexer or other higher order multiplexer includes, but is not limited to, cascaded optical couplers. A particular example of a suitable optical coupler is a Wavelength-Division Multiplexing (WDM) coupler.

Suitable secondary receivers 50 include or consist of light sensors configured to convert the received secondary downstream light signal to an electrical signal. Examples of light sensors include, one or more photodetectors, one or more photodiodes and one or more avalanche photodiodes, charge coupled devices (CCDs), and photomultiplier tubes. Specific examples of suitable light sensors are PIN (P-type Insulator N-type) light detectors such as InGaAs PIN detector. In some instances, the secondary receiver 56 includes one or more electrical filters that receives the electrical signals from the light sensors. The one or more electrical filters can be configured to filter the downstream control data out of the electrical signals. As a result, an output of the one or more filters carries primarily the downstream data.

Although FIG. 1 and FIG. 2 above disclose the downstream optical signals coming from a single provider, the system can include multiple providers and the downstream optical signals received at an end location can originate from different providers. For instance, the transceiver unit 22 can be configured to operate as a triplexer and the downstream optical signals can originate from a provider of television signals while the secondary downstream optical signals can originate from a provider of DSL Internet access.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. A transceiver unit for use at an end-location of a communications network, comprising:
 a downstream monitor configured to monitor downstream optical signals that travel from a service provider to the end-location,
  the downstream optical signals carrying downstream data for use by a device in communication with the transceiver unit,
  at least a portion of an optical path traveled by the downstream optical signals being on a common optical fiber along with downstream optical signals for other end locations;
 an upstream attenuator configured to attenuate upstream optical signals traveling from the end-location to the service provider,
  the upstream optical signals carrying upstream data for use by the communications network or the provider,
  at least a portion of an optical path traveled by the upstream optical signals being on the common optical fiber;
 electronics configured to operate the upstream optical attenuator in response to output from the downstream monitor, wherein the electronics are configured to increase a degree of attenuation provided by the upstream attenuator in response to the output from the downstream monitor indicating an increase in an intensity of the downstream optical signals.

2. The unit of claim 1, wherein the monitor is configured to convert a portion of the downstream optical signals to an electrical signal that is received by the electronics.

3. The unit of claim 1, wherein the electronics are configured to decrease a degree of attenuation provided by the upstream attenuator in response to the output from the downstream monitor indicating a decrease in an intensity of the downstream optical signals.

4. The unit of claim 1, wherein the downstream optical signals carry downstream control data and the electronics are configured to operate the upstream optical attenuator in response to the downstream control data.

5. The unit of claim 1, wherein the electronics are configured to employ the upstream attenuator as a modulator and to modulate upstream control data onto the upstream optical signals.

6. The unit of claim 5, wherein the upstream control data is transmitted at a lower frequency than the upstream data.

7. The unit of claim 5, wherein the electronics modulate the upstream control data onto the upstream optical signals in response to the output from the downstream monitor.

8. The unit of claim 7, wherein the downstream control data includes an inquiry and the upstream control data that the electronics modulate onto the upstream optical signal provides a response to the inquiry.

9. The unit of claim 1, wherein the transceiver unit includes a transmitter configured to generate the upstream optical signals.

10. The unit of claim 9, wherein the upstream attenuator is configured to attenuate the upstream optical signals traveling from the transmitter to the common waveguide.

11. The unit of claim 9, wherein the transceiver unit includes an upstream monitor in a feedback loop with the transmitter, the upstream monitor configured to convert a portion of the upstream optical signals into an electrical signal.

12. The unit of claim 11, wherein the feedback loop is configured to maintain an intensity of the upstream optical signals generated by the transmitter between an upper threshold and a lower threshold.

13. The unit of claim 1, wherein the transceiver unit includes a receiver configured to receive the downstream optical signals, the receiver configured to convert the downstream optical signals into electrical signals.

14. The unit of claim 13, wherein the downstream monitor is optically between the receiver and the common waveguide.

15. The unit of claim 14, wherein the transceiver unit includes a downstream attenuator in a feedback loop with the receiver.

16. The unit of claim 15, wherein the feedback loop is configured to maintain an intensity of the downstream optical signals received by the receiver below an upper threshold.

17. The unit of claim 16, wherein the feedback loop is configured to maintain the intensity of the downstream optical signals received by the receiver above a lower threshold.

18. A transceiver unit for use at an end-location of a communications network, comprising:
- a downstream monitor configured to monitor downstream optical signals that travel from a service provider to the end-location,
  - the downstream optical signals carrying downstream data for use by a device in communication with the transceiver unit,
  - at least a portion of an optical path traveled by the downstream optical signals being on a common optical fiber along with downstream optical signals for other end locations;
- an upstream attenuator configured to attenuate upstream optical signals traveling from the end-location to the service provider,
  - the upstream optical signals carrying upstream data for use by the communications network or the provider,
  - at least a portion of an optical path traveled by the upstream optical signals being on the common optical fiber;
- electronics configured to operate the upstream optical attenuator in response to output from the downstream monitor, wherein the electronics are configured to decrease a degree of attenuation provided by the upstream attenuator in response to the output from the downstream monitor indicating a decrease in an intensity of the downstream optical signals.

19. The unit of claim 18, wherein the monitor is configured to convert a portion of the downstream optical signals to an electrical signal that is received by the electronics.

20. The unit of claim 18, wherein the downstream optical signals carry downstream control data and the electronics are configured to operate the upstream optical attenuator in response to the downstream control data.

21. The unit of claim 18, wherein the electronics are configured to employ the upstream attenuator as a modulator and to modulate upstream control data onto the upstream optical signals.

22. The unit of claim 21, wherein the upstream control data is transmitted at a lower frequency than the upstream data.

23. The unit of claim 21, wherein the electronics modulate the upstream control data onto the upstream optical signals in response to the output from the downstream monitor.

24. The unit of claim 23, wherein the downstream control data includes an inquiry and the upstream control data that the electronics modulate onto the upstream optical signal provides a response to the inquiry.

25. The unit of claim 18, wherein the transceiver unit includes a transmitter configured to generate the upstream optical signals.

26. The unit of claim 25, wherein the upstream attenuator is configured to attenuate the upstream optical signals traveling from the transmitter to the common waveguide.

27. The unit of claim 25, wherein the transceiver unit includes an upstream monitor in a feedback loop with the transmitter, the upstream monitor configured to convert a portion of the upstream optical signals into an electrical signal.

28. The unit of claim 27, wherein the feedback loop is configured to maintain an intensity of the upstream optical signals generated by the transmitter between an upper threshold and a lower threshold.

29. The unit of claim 18, wherein the transceiver unit includes a receiver configured to receive the downstream optical signals, the receiver configured to convert the downstream optical signals into electrical signals.

30. The unit of claim 29, wherein the downstream monitor is optically between the receiver and the common waveguide.

31. The unit of claim 30, wherein the transceiver unit includes a downstream attenuator in a feedback loop with the receiver.

32. The unit of claim 31, wherein the feedback loop is configured to maintain an intensity of the downstream optical signals received by the receiver below an upper threshold.

33. The unit of claim 32, wherein the feedback loop is configured to maintain the intensity of the downstream optical signals received by the receiver above a lower threshold.

34. A transceiver unit for use at an end-location of a communications network, comprising:
- a downstream monitor configured to monitor downstream optical signals that travel from a service provider to the end-location,
  - the downstream optical signals carrying downstream data for use by a device in communication with the transceiver unit,
  - at least a portion of an optical path traveled by the downstream optical signals being on a common optical fiber along with downstream optical signals for other end locations;

an upstream attenuator configured to attenuate upstream optical signals traveling from the end-location to the service provider,
the upstream optical signals carrying upstream data for use by the communications network or the provider,
at least a portion of an optical path traveled by the upstream optical signals being on the common optical fiber;
electronics configured to operate the upstream optical attenuator in response to output from the downstream monitor;
a transmitter configured to generate the upstream optical signals; and
an upstream monitor in a feedback loop with the transmitter, the upstream monitor configured to convert a portion of the upstream optical signals into an electrical signal.

35. The unit of claim 34, wherein the monitor is configured to convert a portion of the downstream optical signals to an electrical signal that is received by the electronics.

36. The unit of claim 34, wherein the downstream optical signals carry downstream control data and the electronics are configured to operate the upstream optical attenuator in response to the downstream control data.

37. The unit of claim 34, wherein the electronics are configured to employ the upstream attenuator as a modulator and to modulate upstream control data onto the upstream optical signals.

38. The unit of claim 37, wherein the upstream control data is transmitted at a lower frequency than the upstream data.

39. The unit of claim 37, wherein the electronics modulate the upstream control data onto the upstream optical signals in response to the output from the downstream monitor.

40. The unit of claim 39, wherein the downstream control data includes an inquiry and the upstream control data that the electronics modulate onto the upstream optical signal provides a response to the inquiry.

41. The unit of claim 34, wherein the upstream attenuator is configured to attenuate the upstream optical signals traveling from the transmitter to the common waveguide.

42. The unit of claim 34, wherein the transceiver unit includes a receiver configured to receive the downstream optical signals, the receiver configured to convert the downstream optical signals into electrical signals.

43. The unit of claim 42, wherein the downstream monitor is optically between the receiver and the common waveguide.

44. The unit of claim 43, wherein the transceiver unit includes a downstream attenuator in a feedback loop with the receiver.

45. The unit of claim 44, wherein the feedback loop is configured to maintain an intensity of the downstream optical signals received by the receiver below an upper threshold.

46. The unit of claim 45, wherein the feedback loop is configured to maintain the intensity of the downstream optical signals received by the receiver above a lower threshold.

47. A transceiver unit for use at an end-location of a communications network, comprising:
a downstream monitor configured to monitor downstream optical signals that travel from a service provider to the end-location,
the downstream optical signals carrying downstream data for use by a device in communication with the transceiver unit,
at least a portion of an optical path traveled by the downstream optical signals being on a common optical fiber along with downstream optical signals for other end locations;
an upstream attenuator configured to attenuate upstream optical signals traveling from the end-location to the service provider,
the upstream optical signals carrying upstream data for use by the communications network or the provider,
at least a portion of an optical path traveled by the upstream optical signals being on the common optical fiber;
electronics configured to operate the upstream optical attenuator in response to output from the downstream monitor; and
a receiver configured to receive the downstream optical signals, the receiver configured to convert the downstream optical signals into electrical signals; and
a downstream attenuator in a feedback loop with the receiver.

48. The unit of claim 47, wherein the monitor is configured to convert a portion of the downstream optical signals to an electrical signal that is received by the electronics.

49. The unit of claim 47, wherein the downstream optical signals carry downstream control data and the electronics are configured to operate the upstream optical attenuator in response to the downstream control data.

50. The unit of claim 47, wherein the electronics are configured to employ the upstream attenuator as a modulator and to modulate upstream control data onto the upstream optical signals.

51. The unit of claim 50, wherein the upstream control data is transmitted at a lower frequency than the upstream data.

52. The unit of claim 50, wherein the electronics modulate the upstream control data onto the upstream optical signals in response to the output from the downstream monitor.

53. The unit of claim 52, wherein the downstream control data includes an inquiry and the upstream control data that the electronics modulate onto the upstream optical signal provides a response to the inquiry.

54. The unit of claim 47, wherein the upstream attenuator is configured to attenuate the upstream optical signals traveling from the transmitter to the common waveguide.

55. The unit of claim 47, wherein the downstream monitor is optically between the receiver and the common waveguide.

56. The unit of claim 47, wherein the feedback loop is configured to maintain an intensity of the downstream optical signals received by the receiver below an upper threshold.

57. The unit of claim 56, wherein the feedback loop is configured to maintain the intensity of the downstream optical signals received by the receiver above a lower threshold.

* * * * *